United States Patent Office.

HENRY F. KNODERER, SR., AND LEVI F. KNODERER, OF COLUMBUS, OHIO.

Letters Patent No. 65,092, dated May 28, 1867.

IMPROVED COMPOUND FOR PREVENTING INCRUSTATIONS IN STEAM BOILERS.

The Schedule referred to in these Letters Patent and making part of the same.

TO ALL WHOM IT MAY CONCERN:

Be it known that we, HENRY F. KNODERER and LEVI F. KNODERER, of Columbus, State of Ohio, have invented a new and improved Mode of Preventing and Removing the Scales or Incrustations of Steam Boilers, and Pipes and Tubes belonging thereto; and we do declare the following to be a true and exact description thereof.

The nature of our invention consists in putting into the water of the boiler in any manner most convenient a preparation of two parts of alum and one part of glue, said ingredients being pulverized and mixed, leaving it in the form of a powder, and which will effectually prevent the depositions and accumulations of scales or incrustations, and when cast into the water of a boiler that is already incrustated will completely loosen and remove the same.

What we claim, and desire to secure by Letters Patent, is—

The application of a compound or preparation of two parts of common alum and one part of common glue, prepared and applied as above specified, to prevent and remove the accumulations and incrustations of steam boilers and the pipes and tubes belonging thereto, as hereinbefore specified and substantially set forth.

In testimony that we claim the above, we herewith affix our signatures in presence of two witnesses.

H. FREDERICK KNODERER, SR.,
L. F. KNODERER.

Witnesses:
    JAMES H. ZINN,
    H. F. KNODERER.